United States Patent [19]

Hester

[11] Patent Number: 5,497,916

[45] Date of Patent: Mar. 12, 1996

[54] LIQUID DISPENSER FEATURING AUTOMATIC POURING OF MEASURED DOSES

[76] Inventor: Kenneth D. Hester, 4880 W. 215th St., Bucyrus, Kans. 66013

[21] Appl. No.: 384,667

[22] Filed: Feb. 6, 1995

Related U.S. Application Data

[62] Division of Ser. No. 184,203, Jan. 18, 1994, Pat. No. 5,405,055.

[51] Int. Cl.⁶ ................................................. G01F 11/28
[52] U.S. Cl. ................................................. 222/456
[58] Field of Search .................... 222/109, 424.5, 222/454, 456, 457.5

[56] References Cited

U.S. PATENT DOCUMENTS

| | | | |
|---|---|---|---|
| 890,018 | 6/1908 | Burt | 222/456 X |
| 1,952,558 | 3/1934 | Miller | 222/456 |
| 2,373,551 | 4/1945 | Lauder | 222/456 X |
| 2,423,784 | 7/1947 | Mackey | 222/456 |
| 2,989,216 | 6/1961 | Moro-Lin | 222/454 X |
| 3,172,580 | 3/1965 | Mackey | 222/456 |
| 3,178,081 | 4/1965 | Adams | 222/456 |
| 3,208,650 | 9/1965 | Ham | 222/109 X |
| 3,224,652 | 12/1965 | Ludwig et al. | 222/456 X |
| 4,424,921 | 1/1984 | Feuerstein et al. | 222/456 |
| 4,684,045 | 8/1987 | Su | 222/456 |
| 4,828,149 | 5/1989 | Hester | 222/456 X |
| 4,969,585 | 11/1990 | Hester | 222/434 |
| 5,405,055 | 4/1995 | Hester | 222/456 X |

FOREIGN PATENT DOCUMENTS

| | | | |
|---|---|---|---|
| 683634 | 7/1930 | France | 222/456 |
| 731234 | 8/1932 | France | 222/456 |
| 753767 | 10/1933 | France | 222/456 |
| 775540 | 12/1934 | France | 222/456 |
| 500691 | 11/1954 | Italy | 222/456 |
| 500609 | 11/1954 | Italy | 222/456 |
| 745312 | 2/1956 | United Kingdom | 222/456 |

*Primary Examiner*—Andres Kashnikow
*Assistant Examiner*—Kenneth Bomberg
*Attorney, Agent, or Firm*—Kircher, Bowman & Johnson Kokjer

[57] ABSTRACT

A dispensing device for dispensing measured doses of liquid. A fluid tight container which holds the liquid is equipped with a hollow shell at its bottom portion. The shell has one or more inlets to allow liquid to enter it. A dispensing conduit extends from the shell to the top of the container and presents a dispensing outlet which discharges liquid from the container. A flow restriction in the dispensing conduit prevents the entirety of the conduit from filling with liquid during the dispensing cycle. This assures that an air path remains open in the conduit to provide outside air through a port in the conduit to displace the liquid that is dispensed.

11 Claims, 1 Drawing Sheet

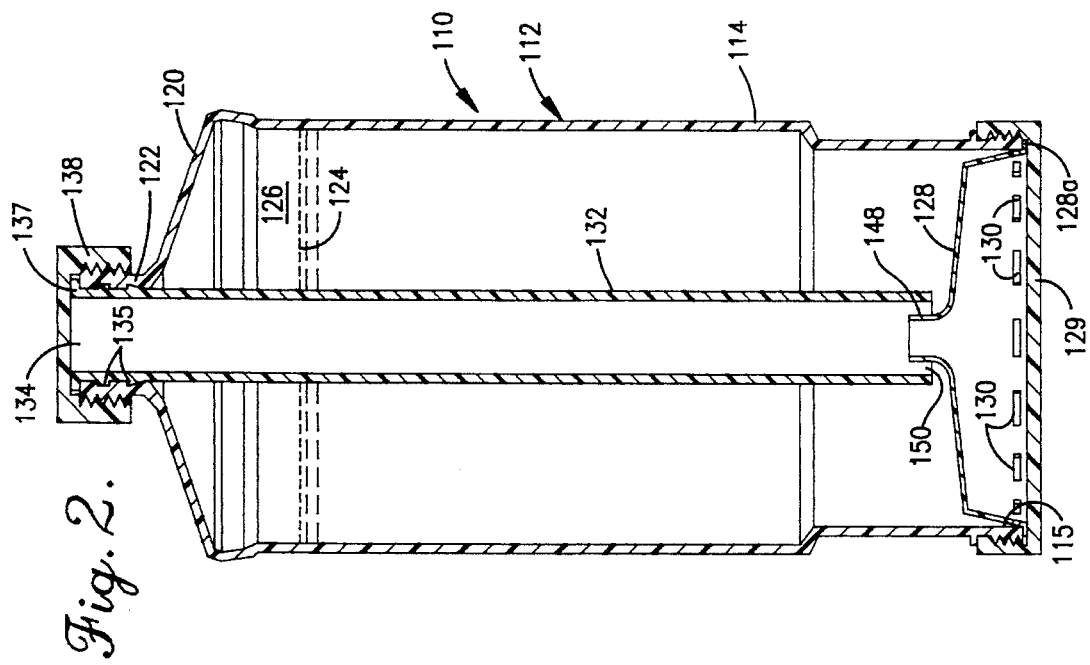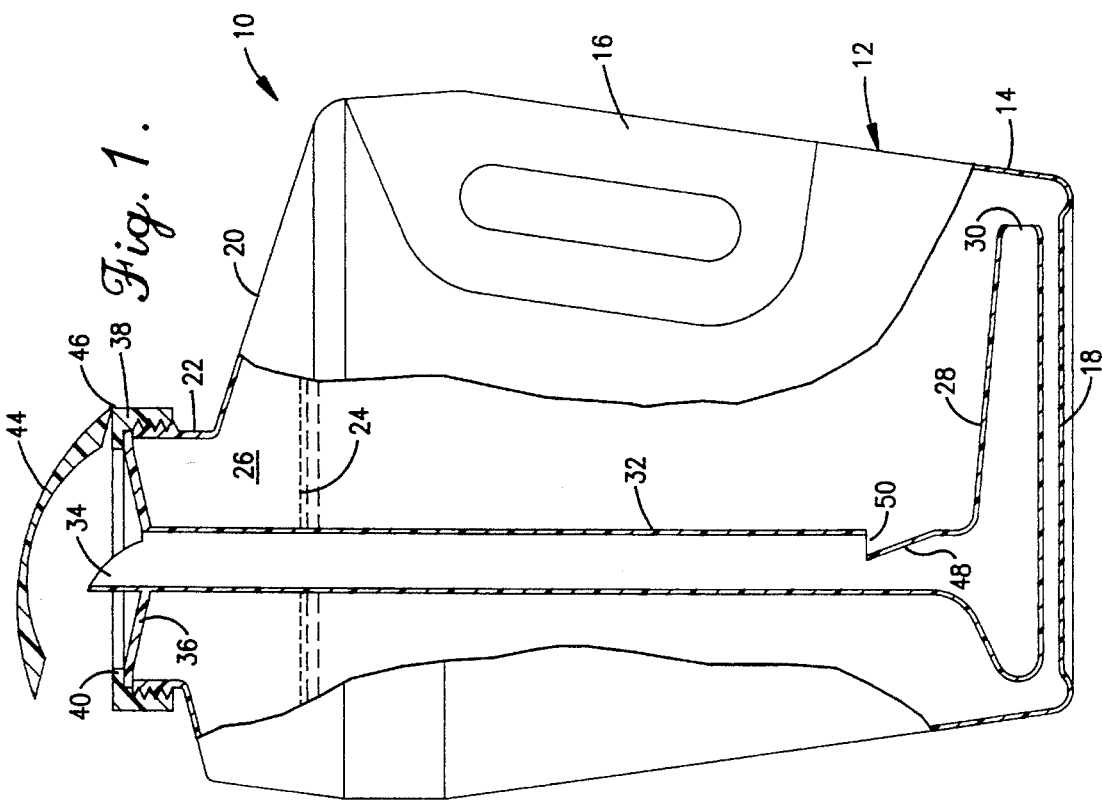

LIQUID DISPENSER FEATURING AUTOMATIC POURING OF MEASURED DOSES

This is a division of application Ser. No. 08/184,203, filed Jan. 18, 1994, now U.S. Pat. No. 5,405,055.

FIELD OF THE INVENTION

This invention relates generally to the dispensing of liquid products such as soaps and bleaches that typically require measured amounts. More particularly, the invention relates to an improved dispenser for providing consistent measured doses of liquid using hydraulic principles without the need for moving parts.

BACKGROUND OF THE INVENTION

Liquid soaps and bleaches used in washing clothes must be applied in the proper quantities in order to achieve the best results. Commonly, the container for the product has a cap which is used as a measuring device to apply the desired dose of liquid. This technique results in spilling of the liquid and is generally messy, and the dosage quantity can also differ appreciably from dose to dose My prior patents, U.S. Pat. Nos. 4,828,149 and 4,969,585, disclose dispensing devices that provide relatively consistent dosage quantities of liquids. However, some of these devices require moving parts and other mechanical complexities. Moreover, the practicality of mass producing at least some of these devices at a low cost may be somewhat questionable.

SUMMARY OF THE INVENTION

The present invention is directed to an improved liquid dispensing device which has a simple construction allowing it to be mass produced at a low cost. Simplicity is provided by relying wholly on hydraulic principles to provide consistent doses without the need for moving parts or other complexities. The invention is particularly characterized by the ability to accurately dispense soaps, bleaches and a wide variety of other liquids by means of a container having a simple and economical construction.

In accordance with one embodiment of the invention, a fluid type container is equipped with a hollow shell located at the bottom of the container body. When the container is in its normal upright position, liquid can enter the shell through one or more inlet ports. Extending upwardly from the shell is a dispensing tube which leads to the top end of the container and serves to dispense liquid from the shell when the container is inverted. The dispensing tube has a flow restriction which prevents it from being completely filled with liquid during the dispensing operation. This assures that an air path is maintained in the tube to allow outside air to enter the container and shell to displace the liquid that is dispensed. The tube is ported to accommodate the flow of air from the tube into the container.

In an alternative embodiment of the invention, the container is open at the bottom to facilitate insertion of a shell that is large enough to occupy substantially the entire bottom portion of the container. After the shell has been inserted, a bottom closure can be applied to close the container bottom. The flow restriction is a reduced neck which forms the outlet from the shell and directs liquid into the larger diameter dispensing tube. The port for air takes the form of an annular opening between the neck of the shell and the end of the tube. Because the shell can be inserted through the bottom of the container, the neck at the top of the container can be relatively small and can be sized to closely receive the top end of the tube in a snap type fit.

DESCRIPTION OF THE DRAWINGS

In the accompanying drawings which form a part of the specification and are to be read in conjunction therewith and in which like reference numerals are used to indicate like parts in the various views:

FIG. 1 is a side elevational view of a liquid dispenser constructed according to one embodiment of the present invention, with portions broken away and shown in section for purposes of illustration; and FIG. 2 is a sectional view, taken on a vertical plane, of a liquid dispenser constructed according to an alternative embodiment of the invention.

DETAILED DESCRIPTION OF THE INVENTION

With initial reference to FIG. 1, numeral 10 generally designates a liquid dispensing device having a container 12. The container 12 has a body 14 which generally tapers gradually from top to bottom and which is formed with a handle 16 to facilitate grasping with the hand. A generally flat bottom 18 forms the bottom of the container body 14. Near its top end, the container body 14 presents an inclined shoulder 20 which tapers as it extends upwardly and terminates at a connection with a neck 22 of the container body. The neck 22 is open at the top and is externally threaded. Preferably, the container body 14 is molded or otherwise formed as a single part, and it may be constructed of plastic or any other suitable material. The container 10 is fluid tight.

The container body 14 contains liquid which may be liquid soap, bleach or any other liquid that is required to be dispensed in relatively consistent measured doses. The liquid level within container 12 is identified by numeral 24, and it is noted that the level changes as the liquid is dispensed from the container. An air chamber 26 is provided within the container body 14 above the liquid level 24.

Disposed within the lower portion of the container body 14 is a hollow shell 28. The shell 28 has a flat bottom which is generally the same size as the bottom 18 of the container body. Preferably, the shell has a size that is only slightly smaller than that of the bottom portion of the container. An inlet port 30 is formed on one side of the shell 28 and allows liquid from within the container body 14 to enter the shell 28.

A hollow dispensing tube 32 extends upwardly from the top portion of the shell 28. The tube 32 has a substantially vertical orientation and extends upwardly through the container body 14, the air chamber 26 and the neck 22. The top end of the tube 32 is open and is angled to provide a dispensing spout 34 through which liquid is discharged from the container. A drip return funnel 36 extends from the top portion of the dispensing tube 32 and inclines upwardly somewhat as it extends outwardly away from the body of the tube. The funnel 36 connects with tube 32 at the height of the lower part of the dispensing spout 34 such that any liquid that is caught on the funnel 36 drains downwardly along the funnel and is directed back into the dispensing tube 32.

The outer edge of the funnel 36 seats on the upper edge of the neck 22. An internally threaded cap 38 is threaded onto the neck 22 and has an inwardly extending lip 40 which overlies the outer edge of the funnel 36. When the cap 38 is tightened onto the neck 22, the lip 40 squeezes the edge of the funnel 36 between the lip and the top edge of the neck 22, thus securing the dispensing tube 32 and the shell 28 in place within the container body. A gasket or other seal element (not shown) may be used to provide a seal between the neck 22, the funnel 36 and the cap 38 if necessary.

A flip type lid 44 is connected with the cap 38 by a hinge 46. The cap 44 may be flipped open as shown in FIG. 1, or it may be pressed downwardly about the hinge 46 in order to close the top of the container. In the open position of the lid, spout 34 is exposed. The spout is enclosed when the lid is closed. It is noted that the cap 38 may be threaded off of the neck 22 to remove it from the container and allow the tube 32 to be lifted far enough to allow liquid to be poured into the container body 14.

At a location slightly above its junction with the shell 28, tube 32 is provided with a flow restriction 48. The restriction 48 may be formed by cutting through one side of the tube 32 and deforming the tube inwardly below the cut. The cut provides a port 50 in the tube 32 at a location between the top edge of the flow restriction 48 and the wall of the tube 32. The port 50 accommodates the flow of air into the container body, as will be explained more fully. The restriction 48 presents a cross-sectional area of tube 32 which is reduced considerably compared to the cross-sectional area of the remainder of the tube. Preferably, the flow restriction provided by the restriction 48 restricts the flow to a level that is somewhat more than 50% of what the flow would be without the restriction. In other words, the restriction in area is somewhat less than 50%. Preferably, the port 50 is at a location on the tube 42 diametrically opposed to the high point of the dispensing spout 34.

In use of the dispensing device 10, the container 12 holds the liquid (such as liquid soap or liquid bleach) that is to be dispensed in measured doses. When the container is in its normal upright position as shown in FIG. 1, the liquid in the container body flows into the inlet port 30 and completely fills the shell 28, rising into the tube 32 as high as the port 50. Because the container is fluid tight, the liquid cannot rise in the tube 32 above the level of port 50 because air is unable to enter the container to displace liquid rising in the dispensing tube. As the liquid fills the shell 28 and rises toward the port 50, the air that is displaced from within the shell flows through the port 50 and rises within the liquid to the air chamber 26.

Liquid is dispensed by inverting the container 12. As the container is inverted, the air within the air chamber 26 moves to a position adjacent to the shell 28. The volume of liquid contained within the shell 28 and the lower portion of tube 32 flows by gravity through the tube 32 and is dispensed through the spout 34. Because of the presence of the flow restriction 48, the liquid flowing through tube 32 is not able to occupy the entirety of the dispensing tube, and this leaves an open air path leading from the spout 34 to the port 50. Thus, incoming air is able to flow through the tube 32 to displace the volume of liquid that is dispensed, and air is able to enter the shell 28 through inlet port 30 as the liquid flows out of the shell.

The volume of liquid that is dispensed during each dispensing cycle is equal to the volume of the shell 28 and the tube 32 up to the level of the port 50. Because this volume is constant from cycle to cycle, the dosage that is dispensed is consistent from cycle to cycle.

At the end of the dispensing operation, the bottle is returned to its normal upright position. Liquid then naturally flows into shell 28 through port 30 and rises to the level of the port 50. Air is again able to flow through port 50 into the container body and rise to the air chamber 26 to occupy the volume of the liquid that enters the shell 28.

It is desirable for the shell 28 to approximate as close as possible the size and shape of the bottom of the container body. At the same time, the shell 28 must be small enough to be able to be passed through the neck 22 during assembly of the dispenser 10. The ability for the container 10 to be completely emptied depends upon the size and configuration of the shell 28 and its location relative to the bottom of the container.

An alternative construction can provide a well in the bottom portion of the container that occupies only a part of the full container breadth, or that is arranged in a manner to be preferentially filled when the container is in an upright position, or that is arranged to be preferentially filled when the container is passing from the upright position to an inverted dispensing position.

The port 50 should be located as low as possible while allowing the entirety of the shell 28 to be filled with liquid. The shape of port 50 is not of significant importance, and the port can be formed as an aperture or other opening in the wall of the tube 32. The circumferential position of the port 50 opposite the high point of the spout 34 is significant because when the container is tipped for dispensing, it is tipped such that the high part of the spout 34 is in a leading position while the container is being inverted. The air path that remains open is diametrically opposite to the high part of the spout, thus allowing the air to reach the port 50 relatively unimpeded by fluid which is discharging through the tube 32. It is also noted that when the container is inverted, the liquid level should be below the port 50 in order to avoid obstructing the port to air flow.

A relatively small size for the inlet port 30 is desirable in order to minimize spilling of liquid from the shell into the container while the container is being moved to the inverted position. The rate at which fluid is dispensed is controlled in part by the sizes of the ports 30 and 50. Fluid can flow through the tube 32 during the dispensing operation only as fast as air can pass through the ports 50 and 30 to displace the fluid that is being dispensed.

In order to assure accuracy of the initial dose of liquid, it is desirable to provide a seal for the spout 34 during assembly and shipping of the dispenser. If such a seal is in place, liquid from the container cannot rise within the dispensing tube 32 before a seal is effected between the neck 22, funnel 36 and cap 38 while the unit is being assembled. Once this seal is intact, the liquid cannot rise within the dispensing tube 32 above the level of port 50 for reasons previously described, and the seal on the spout 34 can then be removed.

If the container 12 is shipped or stored laying on its side, it is possible that the volume between the closed lid 44 and the funnel 36, the volume within the vent tube 32, and part of shell 28 would all contain liquid. If the container is then returned to an upright position, the air contained in shell 24 could pass through tube 32 and reach the volume presented between the lid 44 and funnel 36. The liquid in this space as well as that in the tube 32 could be displaced to the level of the port 50. However, if the volume of air that is delivered in this manner is less than the volume of liquid, all of the liquid above the port 50 may not be drained. Consequently, the initial dispensing cycle may not be completely accurate.

This problem can be solved by completely inverting the container after it has been stored on its side. With lid 44 closed and the container inverted, the liquid content of shell 28 would flow through tube 32 until it is completely filled.

The remainder of the liquid flowing out of the shell 28 would then pass through port 50 and return to the interior of the container. Subsequent movement of the container to its upright position would allow the shell 28 to refill with fluid, and this incoming fluid would displace the air contained in the shell through the dispensing tube 32 and displace the fluid located above the port 50. It is noted that complete restoration of accurate dispensing in this manner requires that the volume of the shell 28 and the part of tube 32 below the port 50 be greater than the combined volume of tube 32 above port 50 and the volume located between the closed lid 44 and the funnel 36.

For each situation that is encountered, these factors can be taken into account, and appropriate sizes can be selected so that optimum dispensing results are achieved.

The shell 28 can be formed as an integral part of the bottom portion of the container, and the shell can have a reduced size neck which extends into the bottom end of a separate dispensing tube 32 which is larger in diameter than the neck of the shell, with the neck thus providing a flow restriction and the annular space between the neck and the larger dispensing tube presenting the port 50. Such a neck of the shell need not actually extend into the tube 32; instead it can be arranged such that the liquid that passes through the neck is directed into the tube 32 when the container is inverted.

FIG. 2 depicts an alternative embodiment of the invention in which a modified dispenser 110 includes a container 112. The container 112 has a body 114 presenting an open bottom 115. The body 114 is externally threaded adjacent to the open bottom 115.

The top portion of the container body 114 has an inclined shoulder 120 which connects at its top end with a neck 122 of the container body. The neck 122 is open at the top and is externally threaded and grooved on its interior surface, as will be explained more fully. The container 112 holds liquid, the level of which is identified by numeral 124. Again, the level varies as the contents of the container are dispensed. The top portion of the container body presents an air chamber 126 located above the liquid level 124.

A hollow shell 128 is disposed in the bottom portion of the container body 114. The shell 128 has a size slightly smaller than that of the open bottom 115 of the container so that the shell can be inserted into the container through the open bottom 115. The shell 128 has an outwardly extending peripheral flange 128a which fits against the lower edge of the container body 114 adjacent to the open bottom 115. A removable bottom closure 129 may be threaded onto the bottom of the container and tightened to capture the flange 128a between the bottom edge of the container body 114 and the closure, thus securing the shell 128 in place in the bottom portion of the container. The closure 129 provides a fluid tight seal on the bottom of the container, and suitable gaskets or other seal elements (not shown) may be provided if necessary to provide an effective seal. A plurality of inlets 130 are provided in the shell 128 to allow liquid to flow into the shell from the interior of the container body.

A vertical dispensing tube 132 extends vertically within the container body 114. The tube 132 has an open top end 134 which provides a dispensing spout through which liquid may be poured from the container. The top portion of the tube 132 has outwardly projecting ribs 135 which fit into the mating grooves on the inside surface of the neck 122. In this manner, the tube 132 is held in place in a snap fit with the neck 122. The top end of tube 132 has an outwardly projecting flange 137 which fits against the top edge of the neck 122. The threaded cap 138 may be screwed onto the neck 122 and tightened down against the flange 137. When the cap 138 is in place, it provides a fluid tight seal for the top of the tube 132 and the container body 114. Suitable gaskets or other seals (not shown) may be provided if required for an effective seal.

The two lower end of the tube 132 is open and receives a tubular neck 148 which extends from the center of the shell 128. Neck 148 is smaller in diameter than tube 132 and thus provides a flow restriction between the shell and the dispensing tube 132. Because tube 132 is larger in diameter than the neck 148, an annular space is presented between the lower end of the tube and the neck 148, thus providing a port 150 allowing air to enter the container.

The container 110 dispenses its liquid contents in substantially the same manner described previously in connection with container 10. When the cap 138 is removed, the liquid within the container body flows through the ports 130 into the shell 128 and rises in the shell to the level of the port 150. The contents of the shell 128 and neck 148 can be dispensed by inverting the container. Because of the presence of the flow restricting neck 148, the dispensing tube 132 is not completely filled with the liquid that is being dispensed, and an air path is left allowing outside air to flow into the open end 134 of tube 132, along the length of tube 132, and into the container through the port 150. The air is able to enter shell 128 through inlets 130 in order to displace the fluid that is being dispensed. At the end of the dispensing operation, the container is returned to its upright position, and liquid again enters and fills shell 128 and neck 148. Thus, each dispensing cycle dispenses a consistent volume of liquid.

The open bottom container 114 facilitates assembly of the components, because the shell 128 can be inserted through the large open bottom 115 and secured in place by applying the closure 129. Because the shell does not need to pass through the neck 122, the neck can be reduced considerably in size and is preferably just large enough to closely receive the dispensing tube 132.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A liquid dispenser for dispensing liquid in measured amounts, comprising:

a substantially fluid tight container for holding the liquid, said container having top and bottom portions and an air chamber in said top portion above the liquid level in the container;

a hollow shell disposed in the bottom portion of said container, said shell having an inlet therein for accommodating flow of liquid from the container into said shell;

conduit means providing a flow path for liquid to flow from the shell out of the container for dispensing of the liquid, said conduit means including a dispensing tube extending through said top portion of the container and terminating in a dispensing outlet for discharging liquid from the container;

a flow restriction in said conduit means for restricting the flow therethrough sufficiently to prevent said tube from being filled with liquid when the container is inverted to dispense liquid, thereby leaving an air path in said conduit means for accommodating entry of air to displace the liquid discharged from the container; and a port in said conduit means located substantially adjacent to said flow restriction in communication with said air path to direct air from said air path into the container to displace the liquid dispensed through said outlet.

2. The dispenser of claim 1, including:

an open bottom of said container large enough to receive said shell; and a removable closure for said bottom applicable to the container to provide a fluid tight seal thereon.

3. The dispenser of claim 2, including:

a lower edge of said container extending around said open bottom; and a peripheral flange on said shell captured between said lower edge and said closure to secure said shell in place in the container.

4. The dispenser of claim 3, including:

a neck on the top portion of said container; and means for securing said dispensing tube in said neck.

5. The dispenser of claim 4, wherein:

said conduit means includes a tubular outlet extending from the shell and smaller than said dispensing tube to provide said flow restriction; and said port is presented between said tubular outlet and said dispensing tube.

6. The dispenser of claim 1, wherein:

said conduit means includes a tubular outlet extending from the shell and smaller than said dispensing tube to provide said flow restriction; and said tubular outlet extends into said dispensing tube and is spaced inwardly therefrom to present said port.

7. A dispenser for dispensing liquid in measured amounts, comprising:

a container for the liquid having a body presenting an open bottom and a top which includes a neck reduced in size compared to the body, said neck being open at the top and said body presenting an air chamber in the top portion thereof above the level of liquid in the container;

a hollow shell disposed in the container adjacent the bottom thereof and having a size to occupy substantially the entirety of the container bottom portion, said open bottom allowing insertion of said shell into said container;

an inlet for said shell allowing liquid in the container to enter the shell;

a removable bottom closure for closing the bottom of the container body in fluid tight fashion;

conduit means providing a flow path for liquid to flow from the shell out of the container, said conduit means including a dispensing tube extending through said top portion of the container and said neck and terminating in an outlet for discharging liquid from the container;

means for providing a flow restriction in said conduit means to restrict the flow therethrough sufficiently to prevent the dispensing tube from being completely filled with liquid when the container is inverted to dispense liquid, thereby maintaining an air path in said tube to allow air from outside the container to displace the liquid dispensed from the container; and a port in said conduit means located substantially adjacent to said flow restriction and communicating with said air path to accommodate flow of air into the container through said port to displace liquid dispensed through said tube.

8. The dispenser of claim 7, including:

a lower edge of said container extending around said open bottom; and a peripheral flange on said shell captured between said lower edge and said closure to secure said shell in place in the container.

9. The dispenser of claim 8, including means for securing said dispensing tube in said neck.

10. The dispenser of claim 9, wherein:

said conduit means includes a tubular outlet extending from the shell and smaller than said dispensing tube to provide said flow restriction; and said port is presented between said tubular outlet and said dispensing tube.

11. The dispenser of claim 7, wherein:

said conduit means includes a tubular outlet extending from the shell and smaller than said dispensing tube to provide said flow restriction; and said tubular outlet extends into said dispensing tube and is spaced inwardly therefrom to present said port.

* * * * *